106-85

1381748

UNITED STATES PATENT OFFICE.

THOMAS ROUSE, OF STAMFORD HILL, ENGLAND.

MANUFACTURE OF AGGLOMERATES OF VARIOUS MATERIALS AND THEIR UTILIZATION.

1,381,748.     Specification of Letters Patent.     Patented June 14, 1921.

No Drawing.     Application filed September 12, 1919. Serial No. 323,323.

*To all whom it may concern:*

Be it known that I, THOMAS ROUSE, a subject of the King of Great Britain, and resident of Stamford Hill, in the county of Middlesex, England, have invented certain new and useful Improvements in the Manufacture of Agglomerates of Various Materials and Their Utilization, of which the following is a full, clear, and exact description.

This invention relates to the manufacture of agglomerate of the kind comprising ferro-boro-silicate, such as described in the specification of U. S. Patent No. 1109704, as an agglomerating agent and has for its object a production of such agglomerates in a simple, rapid and inexpensive manner, whereby their sphere of utility is enlarged and material hitherto regarded of no or relatively low commercial value made available for useful service.

According to the present invention, material or materials to be agglomerated are in suitable physical condition, mixed in required proportion with ferro-boro-silicate and subjected to the action of steam until the desired effect is produced.

Materials have been proposed to be agglomerated by mixing them with pulverized solid water glass with or without a small quantity of oxid of iron or the like and subjecting the mass to the action of steam. The mixture does not, however, comprise ferro-boro-silicate which, treated according to the present invention, produces changes and imparts valuable properties to the agglomerate found to result from the presence of the boron compound.

In carrying out the invention, the ingredients including the ferro-boro-silicate are mixed in a suitable state of subdivision in a dry condition and treated with steam, as by blowing the same into the mass, until the material becomes plastic, whereupon it is shaped or molded into the desired form, the agglomerate setting rapidly into a hard, dense and compact body.

Application of pressure during molding is not necessary but may be convenient in the formation say of large articles or masses.

By subjecting the treated material to a baking treatment for say from three to four hours or longer up to a temperature of say from 600° to 800° C., it is rendered highly resistant to moisture.

Suitable proportions in a general way but subject to modification as may be desirable in particular cases are from four to seven per cent. of ferro-boro-silicate powder to the material to be treated.

The invention has a wide range of applicability.

By its aid, for instance, carbon electrodes, or electrodes comprising carbon or carbonaceous substances, mixed or not with metal or metal compound and other selected materials, can be produced suitable for electric furnaces or for general electrolytic practice, the treated mass being molded into plates, cubes, slabs, cylinders or other appropriate shape.

According to one example, ground anthracite and powdered graphite are mixed in equal parts by weight and incorporated with from four and a half per cent. to five per cent. ferro-boro-silicate, also in powder condition, after which steam is blown into the mass until the whole has become plastic, when it is molded into the desired form and left until sufficiently set to be handled without injury, in which condition it can be used or before use it can be first subjected to the mentioned heat treatment. Instead of anthracite, carbon in other form, as petroleum coke, can be used, or the electrodes may contain the carbon wholly as graphite or wholly as anthracite or the like, the proportions of ferro-boro-silicate varying slightly according to the substances selected.

Electrodes according to the invention for electric furnaces can be produced from, in some cases, metalliferous material that is either waste or of low commercial value, and be so composed according to the requirement that the agglomerated constituents of the electrodes will react with constituents of the charge in the smelting, refining or other process in which they are used.

Examples of metalliferous waste material applicable to the manufacture of electrodes according to the invention are forge and hammer scale, steel sawings, filings and turnings; metal grindings recovered from swarf; nickel turnings, sawings and scale; aluminium waste turnings and aluminium recovered from swarf; copper and brass turnings, sawings and trimmings, zinc waste and so forth.

To the blends produced from the mixtures of the above kindred materials, as for instance concentrated ore, other materials or compounds, can be added as needful to yield an electrode having a desired composition. In particular, pulverulent iron sands, titanate of ferrous iron or other titaniferous ore such for instance as ores rich in rutile, nigrin or ilmenite may be mentioned, as providing suitable additions according to circumstances and also as suitable for separate use or in selected combination among themselves. Also ferric or other oxid and aluminium in admixture in reacting proportions such as usual in producing a combustible composition or in other proportions.

In treating metalliferous matter or waste, hammer scale for instance, according to the invention about four per cent. of dry ferro-boro-silicate usually suffices.

Electrodes according to the invention comprising metals or compounds such as specified constitute excellent conductors of electricity. They may have a composition such that their melting point is much higher than that of ordinary iron, be but slowly consumed and such as to give a large heat spreading area and, if subjected to a baking treatment as above referred to, do not deteriorate under the action of moisture, even if wholly immersed for long periods in water. Furthermore, irregularities resulting it may be from use or from damage, as by parts being broken off, can be made good by merely filling in the lacking portion with the needful amount of the steamed plastic mass, and shaping the surface to correspond with the undamaged part when the mass will set and become integral with the remainder.

For arc lamps, ordinary carbon or wholly metallic electrodes can be made according to the invention, the latter possessing in use a high luminous value, the light moreover although intense being soft and pleasing; or, combinations of carbon and metals or other substances can be used.

While possessing particular value in electrode manufacture, the invention is furthermore usefully applicable for agglomerating iron sand or other metalliferous ores or substances for ordinary smelting operations, electric or not.

The invention can in novel manner be utilized for jointing or restoring or making good broken rails, fractured parts of machinery or otherwise combining adjacent parts of metal or metal structure. In such cases metallic combustible mixture which may be of known kind, of say iron oxid and aluminium, each whereof may be derived from metallic waste or other kindred and suitable metallothermic composition produced or not from waste, is agglomerated according to the invention and molded, say into cylinders of suitable size. In use, it suffices to suitably support one or more cylinders of the agglomerate above the said parts and pass a current of electricity transversely through the lower part of the or each cylinder, as by applying to opposite sides thereof contact pieces connected to leads, the current being such as to raise the temperature of the cylinder to say 800° C. which will cause ignition. The ignition, once started, extends throughout the cylinder which, as it proceeds, descends by its own weight, the molten material flowing on to the parts or, instead of applying the electric current direct to the cylinder, the latter can be cupped at its lower end to receive a primer which is ignited by an electric spark and in turn ignites the cylinder. Whichever method is adopted the parts become highly heated, the whole after cooling forming a satisfactory union, needful provision being made for preventing the molten mass from escaping from the region in which it is to be applied.

Mixtures of aluminium and ferric oxid or the like, when treated as above set forth, can be kept indefinitely without risk of chemical or physical change.

Having thus described my invention, what I claim is:—

1. A method of agglomerating material, which comprises mixing it with ferro-boro-silicate, subjecting the mixture to the action of steam and subsequently subjecting the steam-treated mass to heat treatment.

2. A method according to claim 1 in which the mixed ingredients are subjected to the action of the steam until the mass becomes plastic.

3. A method according to claim 2, in which the mass is allowed to cool between the steam treatment and subsequent heat treatment.

4. In combination with a method according to claim 1, the additional step of subjecting the mass after steaming to a high temperature.

5. A method according to claim 1, in which the ferro-boro-silicate is employed in the proportion of approximately 4% to 7% of the material.

6. A method of manufacturing electrodes suitable for use in electric furnaces and the like, which comprises mixing carbonaceous matter with ferro-boro-silicate, agglomerating the mass by the action of steam, molding the mass to shape and afterward subjecting the molded mass to a high temperature, substantially as described.

7. A composition of matter comprising ferro-boro-silicate and another substance agglomerated by the aid of steam.

8. A composition of matter comprising ferro-boro-silicate and carbonaceous matter agglomerated therewith by the aid of steam.

9. A composition of matter comprising ferro-boro-silicate and a metal in divided condition agglomerated by means of steam.

10. A composition of matter comprising metalliferous matter and ferro-boro-silicate agglomerated by the use of steam.

In witness whereof, I have hereunto set my hand.

THOMAS ROUSE.